United States Patent

[11] 3,567,865

[72] Inventors Pe Tsi Chu
Vence, France;
Hans Helmut Adelaar, Kapellenbos; Alois Rene Termote, Edegem, Belgium

[21] Appl. No. 698,924
[22] Filed Jan. 18, 1968
[45] Patented Mar. 2, 1971
[73] Assignee International Standard Electric Corporation
New York, N.Y.
[32] Priority Jan. 23, 1967
[33] Netherlands
[31] 6,701,049

[54] CROSS POINT SWITCHING NETWORK IN A TELECOMMUNICATION SYSTEM
17 Claims, 6 Drawing Figs.

[52] U.S. Cl. ........................................ 179/18
[51] Int. Cl. ........................................ H04q 3/60
[50] Field of Search .................................. 179/18 (TG), 18.7 (YA), 18.7 (Y), 22, 18.211, 18 (SP), 18.3 (C)

[56] References Cited

UNITED STATES PATENTS 3,257,513 6/1966 Feiner .................... 179/18(TG)

FOREIGN PATENTS 1,044,601 10/1966 Great Britain ............... 179/18(TG)

*Primary Examiner*—Kathleen H. Claffy
*Assistant Examiner*—Thomas W. Brown
*Attorneys*—C. Cornell Remsen, Jr., Rayson P. Morris, Percy P. Lantzy, Warren J. Whitesel, Phillip A. Weiss and Delbert P. Warner

ABSTRACT: In a telecommunication system having a plurality of line terminals and common control means, a novel switching network having a first and a second part is provided through which communication paths are established between selected pairs of the line terminals coupled to the first part. A first group of a plurality of output terminals of the first part is connected to a plurality of input terminals of the second part. A second group of the output terminals of the first part is directly connected to a selected group of output terminals of the second part. This manner of interconnection between the first and second parts eliminates the need for an additional switching network otherwise required in prior art devices for completing the communication paths between selected pairs of the line terminals.

Inventors
P. Chu, H. Adelaar, A. Termote
By
Attorney

Inventors
P. Chu, H. Adelaar, A. Termote
By
[signature]
Attorney

Inventors
P. Chu, H. Adelaar, A. Termote
By
Attorney

Inventors
P. Chu, H. Adelaar, A. Termote
By
Attorney

Inventors

P. Chu, H. Adelaar, A. Termote

By

Attorney

CROSS POINT SWITCHING NETWORK IN A TELECOMMUNICATION SYSTEM

FIELD OF THE INVENTION

The present invention relates to a telecommunication switching system, and more particularly, to an improved switching network in such a system.

BACKGROUND OF THE INVENTION

In a large telecommunication switching system adapted to serve a large number of lines such as 60,000 lines or over, a switching network is provided in two portions, commonly known as line link network and trunk link network. The two portions are usually connected to each other through junctor frames. Input terminals to the line link network are connected to a plurality of subscriber lines and the output terminals of the trunklink network are connected to a plurality of trunklines. To provide communication paths between selected pairs of the subscriber lines, the system further provides an additional switching network, known as line junctor link network, coupled to the output terminals of the line link network.

The U.S. Pat. No. 3,257,513 shows such a system. Therein, for a large telephone exchange, the first switching part may be constituted by as many as 16 line networks. Each includes four line switching frames whose inputs are the first input terminals of the network and are connected to the telephone lines. The outputs of these frames are connected to the inputs of four-line junctor switching frames whose outputs are the first output terminals. Each line switching frame includes 16 line concentrators and each junctor switching frame includes four so-called octal grids.

With a 4 to 1 concentration ratio, the line concentrator is a two-stage grid enabling to connect any of its 64 inputs, i.e. making up the first series of inputs terminals, to any of its 16 outputs via a unique path. In such a grid, there is a single patch between each of the four first-stage switches and each of the four second-stage switches. The number of outputs in each switch of the first stage must equal the number of second-stage switches; the number of inputs in each switch of the second-stage switch must equal the number of first-stage switches. Thus each first-stage switch should have 16 inputs and four outputs while each second-stage switch would have four inputs and four outputs. In fact, in the first-stage switch each input may be selectively connected to four out of eight outputs, each of the four leading to a different second-state switch, so that each first-stage switch has eight outputs and 64 cross-points while each second-stage switch has eight inputs and 32 cross-points.

The octal grid is also a two-stage switching arrangement enabling to connect any of its 64 inputs to any of its 64 outputs via a unique path. It comprises eight first-stage switches each with eight inputs, eight outputs and 64 cross-points, as well as eight like second-stage switches.

Each line network may thus selectively connect lines out of a group of 4,096 with line junctor terminals out of a group of 1,024. These line junctor terminals may be coupled to trunks leading to other exchanges through trunk networks generally similar to the line networks, with variations to take into account the higher traffic density on the trunks than on the lines. They can also be interconnected in pairs through junctor circuits in order to establish local interconnections between two lines pertaining to the same exchange.

The second switching part may be used for that purpose and comprises a line junctor link network which is unique for the whole exchange. It is made up of four octal grids as defined above. In each line junctor switching frame there are four outputs connected to one input out of 64 in each of the four octal grids forming the line junctor link network. Each of the 64 outputs of these four grids is in turn connected through a junctor circuit to another output in each line junctor switching frame so that each of the latter has eight out of its 256 outputs coupled to the single line junctor link network. If the latter is not provided, in an exchange of the maximum capacity considered, i.e. 16 × 4096 = 65 536 lines, it would be necessary to reserve at least as many as 65 outputs out of the 256 in order to enable local connections to extend from the line junctor switching frame concerned to itself and to any of the remaining 63 and this would unduly limit the traffic possibilities between the lines and the trunks. As long as the exchange does not reach half the maximum capacity, the line-to-line traffic will generally not be such as to necessitate the introduction of the line junctor link network which is thus employed to cope with problems introduced by very large exchanges with a substantial internal traffic.

SUMMARY OF THE INVENTION

An object of the invention is to realize a switching network of the general type initially defined which is adapted to a wide range of exchanges and particularly to those of relatively small capacity, down to a thousand lines or less.

It is based on the insight that the line junctor link network constituting the second switching part of the overall switching network can be arranged to be advantageous for exchanges of smaller size.

In accordance with a characteristic of the invention, said second switching part is divided into units serving groups of second terminals, each second switching part unit being divided into an outgoing and an incoming section with interconnections between every outgoing section and every incoming section.

In this manner, a group of lines connected to the first series of input terminals can be served by a first and a second switching part units together forming a line module and connections between lines connected to the same or different line modules can be established through an outgoing section in cascade with an incoming section.

Another object of the invention is to facilitate the building up of exchanges of varying sizes.

In accordance with another characteristic of the invention, said first switching part includes terminals connected to local lines as well as terminals connected to trunk lines.

Following another characteristic of the invention, said first switching part includes line concentrators and trunk expanders whose inputs jointly constitute said first series of input terminals and whose outputs are coupled to the inputs of mixing grids whose outputs constitute said first series of output terminals.

In this manner, no trunk link network separate from the line link network is necessary and this is particularly beneficial for the exchanges of smaller capacity. The line concentrators and the trunk expanders connected in this manner equalize the traffic load at the mixing grids and at the junctor circuits. The junctor circuits are provided to enable the second switching part to connect line-to-line line-to-trunk and trunk-to-trunk traffic. Separate pairs of mixing grids for the outgoing trunk traffic are provided in parallel with the mixing grids for the local and incoming traffic at one side of the junctor circuits.

According to another characteristic of the present invention, the incoming and outgoing sections of the second switching part are formed by the mixing grids and a group of the output terminals of the mixing grids are directly coupled to a group of the output terminals of the first switching part.

This means that in a network, e.g. a binary network as disclosed in the above U.S. Patent, of the type where there is only one path between every pair of external terminals to be interconnected, i.e. pairs of terminals out of the first series of input terminals, and which offers a simple determination of the switching path among its advantages since the latter is determined by the identities of the pair of terminals, it is nevertheless possible to secure an adequate grade of service for a limited number of cross-points. Indeed, once a partial path has been chosen between a terminal of the first series of input terminals and one out of the first group of first output terminals which may be associated with subscribers lines and junctor circuits inputs respectively, one may attempt to establish a path between the output of the preselected junctor circuit and the called circuit via as many paths as there are mixing grids in the first switching part. This means that in a large proportion of cases, the junctor circuit chosen for preselection can be kept for selection of the called circuit.

In a modular switching network of the type envisaged here, it would be very desirable not only to be able to keep line units substantially unmodified for exchanges comprising a different number of line units or as new ones are added, but also to avoid a large increase of the number of cross-points due to the necessary interconnections between the different modular switching units.

In accordance with yet another characteristic of the invention, this object is achieved by splitting a series of said sections into a plurality of partial sections respectively coupled to distinct sets of first switching part units.

Preferably, the outgoing sections may be split into a first half-section whose outlets are multiplied to the even numbered modular switching units while the second half-section is multiplied to the remaining odd numbered modular switching units. The peripheral circuits providing a link with central processors controlling such a switching network may be arranged to be half as numerous as the modular switching units, with each peripheral circuit controlling an odd and an even numbered unit.

With such interconnections between the modular switching units it can be shown that the number of cross-points of this interconnecting network linking the various modular switching units may be limited as compared to systematic interconnections between all outgoing and incoming sections and this for the same traffic conditions and grade of service. In particular, the number of cross-points needed for this interconnecting network, when expressed as a number of crosspoint per subscriber line, is a linear function of the number of modular switching units but increases only by one extra crosspoint per line for every four units, this being half the rate secured with interconnections between all units.

In accordance with yet a further characteristic of the invention, additional outgoing and incoming sections are provided in each second switching part unit for connections which do not involve other first switching part units than that associated with the second switching part unit concerned.

This may be valuable in providing separate mixing grids for junctor circuits outputs in order to get access to a called circuit connected to the first series of input terminals. Indeed, outgoing trunks can be connected to mixing grids which take only the traffic outgoing from the exchange and for a particular modular unit, and these mixing grids for outgoing trunk traffic can be multiplied with those for the incoming trunk and local traffic towards the outputs of the various incoming sections of the second switching part. The separate mixing grids can then be used as first choice paths for the outgoing trunk traffic while the other sections will be used as first choice paths or other calls. Only if no path can be found towards the wanted direction by using an outgoing trunk circuit connected to the originating switching module will attempts be made to find suitable free outgoing trunk circuits connected to other switching modules.

The above and other objects and characteristics of the invention and the invention itself will be better understood by referring to a detailed embodiment thereof to be read in conjunction with the accompanying drawings which represent:

DESCRIPTION OF THE PREFERRED EMBODIMENTS

Figure 1:
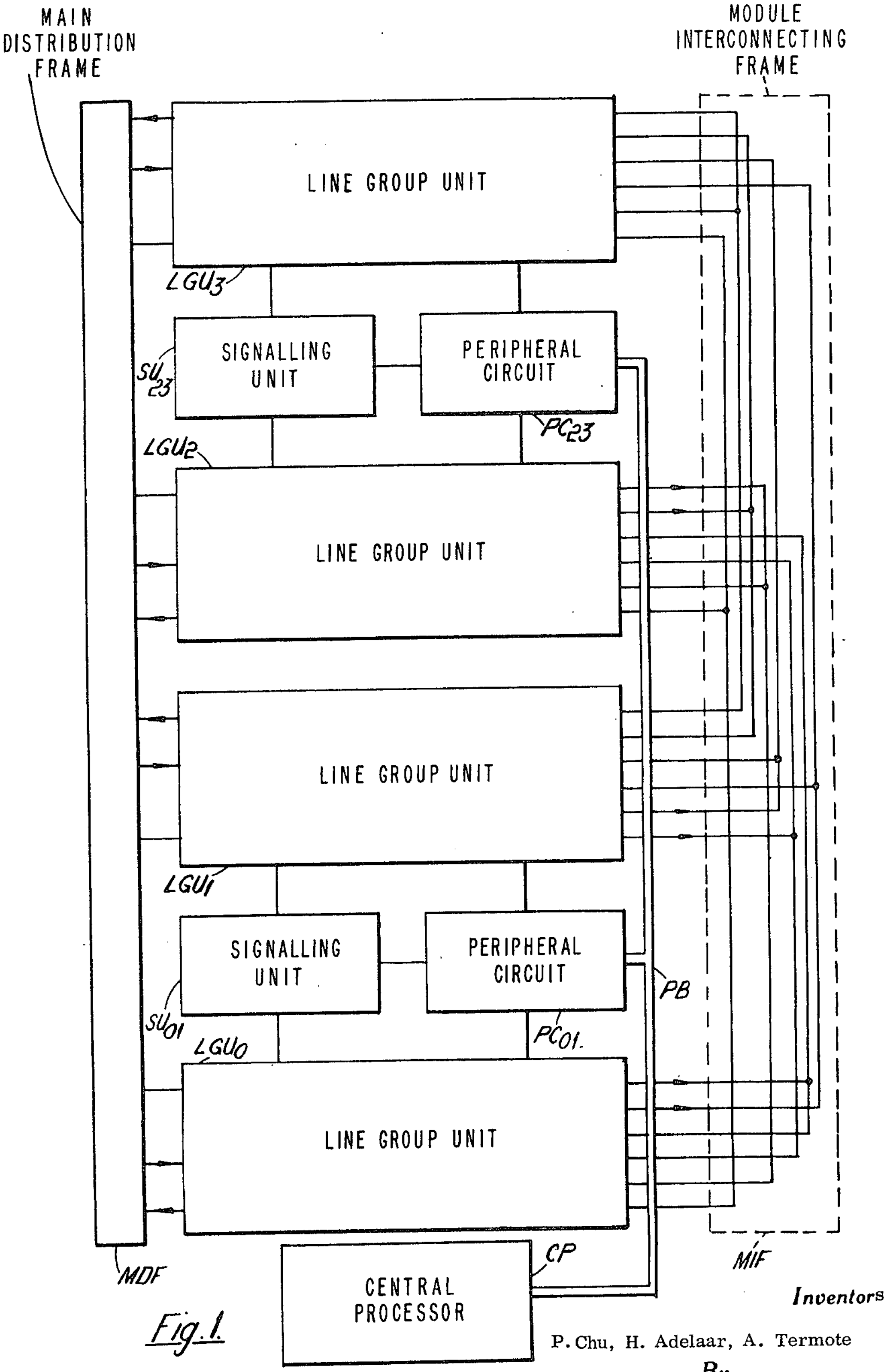
FIG. 1, the block diagram of a modular telephone exchange in accordance with the invention.

Referring to FIG. 1, the latter represents in block diagram form a telephone exchange adapted to serve 4,096 lines together with incoming and outgoing junctions coming from and leading to other exchanges. These lines and junctions are not represented by they are connected to the main distributing frame MDF, on the line side thereof. On the exchange or equipment side of the main distributing frame, both the lines from the subscribers attached to that exchange and the incoming and outgoing junctions are connected to line group units or modules with cater for a total of 1,024 subscribers lines together with an a adaptable number of incoming and outgoing junctions which may vary in accordance with the traffic from 64 to 96 for each type of trunk. There are thus, for an exchange of 4,096 lines, a total of four-line group units labeled from $LGU_0$ to $LGU_3$. Such units or modules as $LGU_0$ essentially comprise the line circuits, the incoming and outgoing junction circuits, the junctor circuits in addition to the switching network.

These networks are controlled by a pair of central processors, each comprising a memory system and logic circuits for the fulfillment of the essential telephone task such as collecting information on the states of the lines, the junctions, the junctors and the links between switching stages, detecting changes of state, assembling for each call all additional information such as line class and routing information necessary for determining the action to be taken with respect to the call, selecting suitable idle paths through the network, dispatching switching orders to the network and checking the correct execution of these orders. Additionally of course these central processors can be programmed to perform the operations needed for the exploitation of the exchange such as call charging, routing testing, service and traffic observations, etc. and for cooperation with the input-output devices.

Electronic peripheral circuits containing buffer registers, scanners for extraction of information from the switching network, and access circuits for controlling the marking and switching operations in the network are interposed between the latter and the central processors so that it may receive the instructions dispatched therefrom and communicate information on the network thereto.

While a switching network of up to 1,024 lines may be advantageous in order to cater for small office sizes, it has been found more efficient to design peripheral circuits which may serve as many as 2,048 lines or two line group units such as $LGU_0$ and $LGU_1$, the corresponding peripheral circuit serving this pair of networks being indicated by $PC_{01}$. Additionally, it may also be advantageous to provide common groups of signalling transmitters and receivers per 2,048 lines and such signalling transmitters and receivers together with a corresponding signalling network are indicated by such blocks as $SU_{01}$ serving the line group units $LGU_{0/1}$, these auxiliary networks $SU_{01}$ and $SU_{23}$ being also associated with the respective peripheral circuits $PC_{01}$ and $PC_{23}$. By means of a common bus PB, the latter communicate with the central processor CP. Only one has been indicated in FIG. 1 but in practice two such processors will be provided preferably in accordance with the arrangement detailed in the copending U.S. Pat. application Ser. No. 698,870 entitled Automatic Telecommunication System and Information Handling System filed on Jan. 18, 1968, and assigned to the present assignee.

Figure 4:
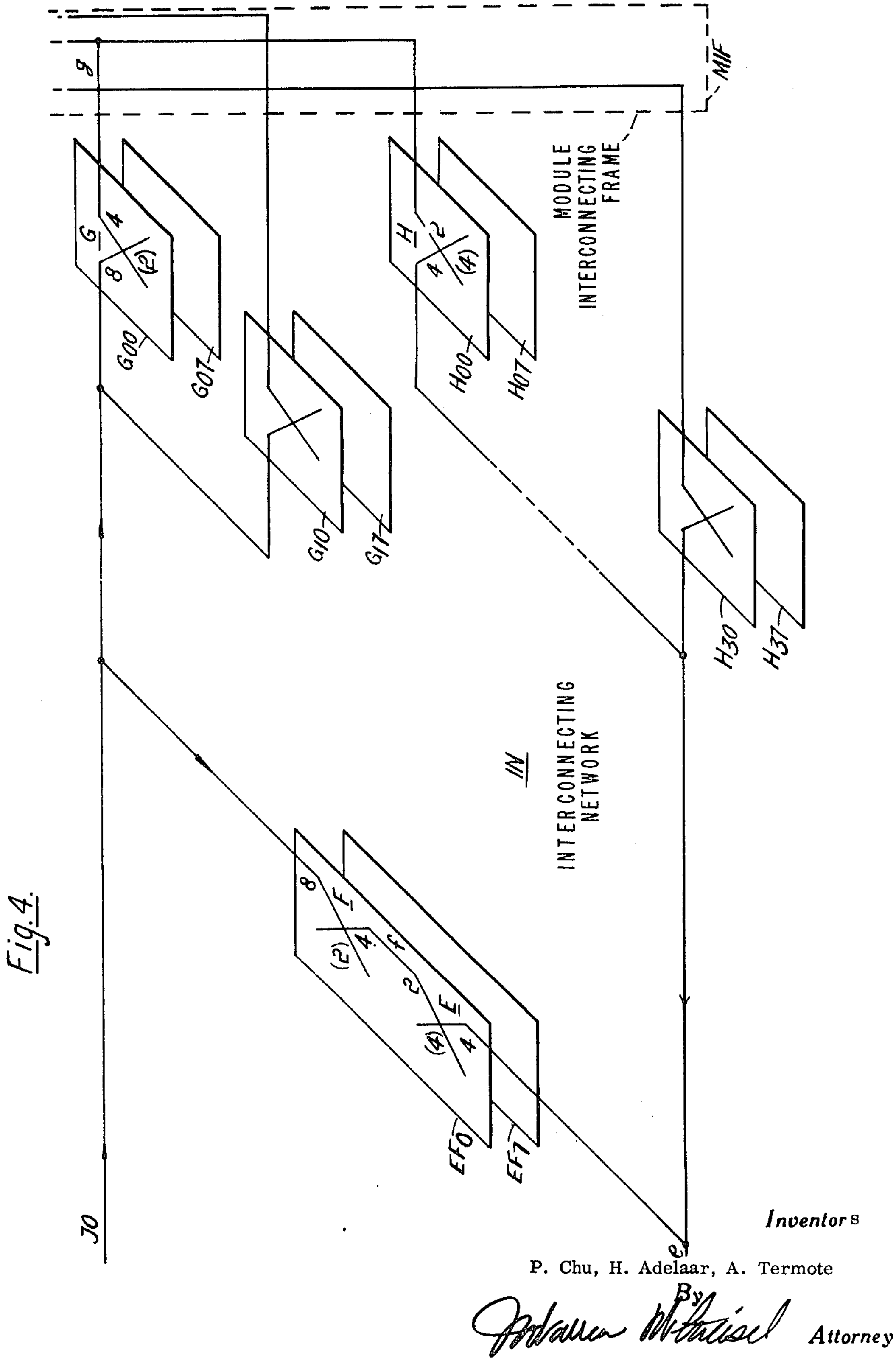
FIG. 4, the trunking scheme of the interconnecting network part of the line group unit of FIG. 2.

In order to realize interconnections between lines or trunks pertaining to different modules, the switching units such as $LGU_0$ are provided with switching stages (not shown in FIG. 1) leading to a module interconnecting frame MIF shown as a dotted line rectangle and through which connections may be established between every module such as $LUG_0$ and the complete set of four modules, including $LGU_0$, although as will be shown with the help of FIG. 4, internal connections within $LGU_0$, need not necessarily be completed through the module interconnecting frame MIF. As shown, there are two sets of connections starting from every module such as $LGU_0$ and these lead to the odd and even numbered units respectively. Thus, the upper connection leading out from $LGU_0$ at the right-hand side thereof is connected to $LGU_0$ and $LGU_2$ while the connection immediately below goes to the other pair of modules, i.e. $LGU_1$ and $LGU_3$. As will be discussed in connection with FIG. 4, this distribution into two sets of multiple connection has been found to be advantageous as it reduces the number of cross-points per subscribers line for such interconnections as the number thereof increases, i.e. as the number of modules increases.

Figure 2:
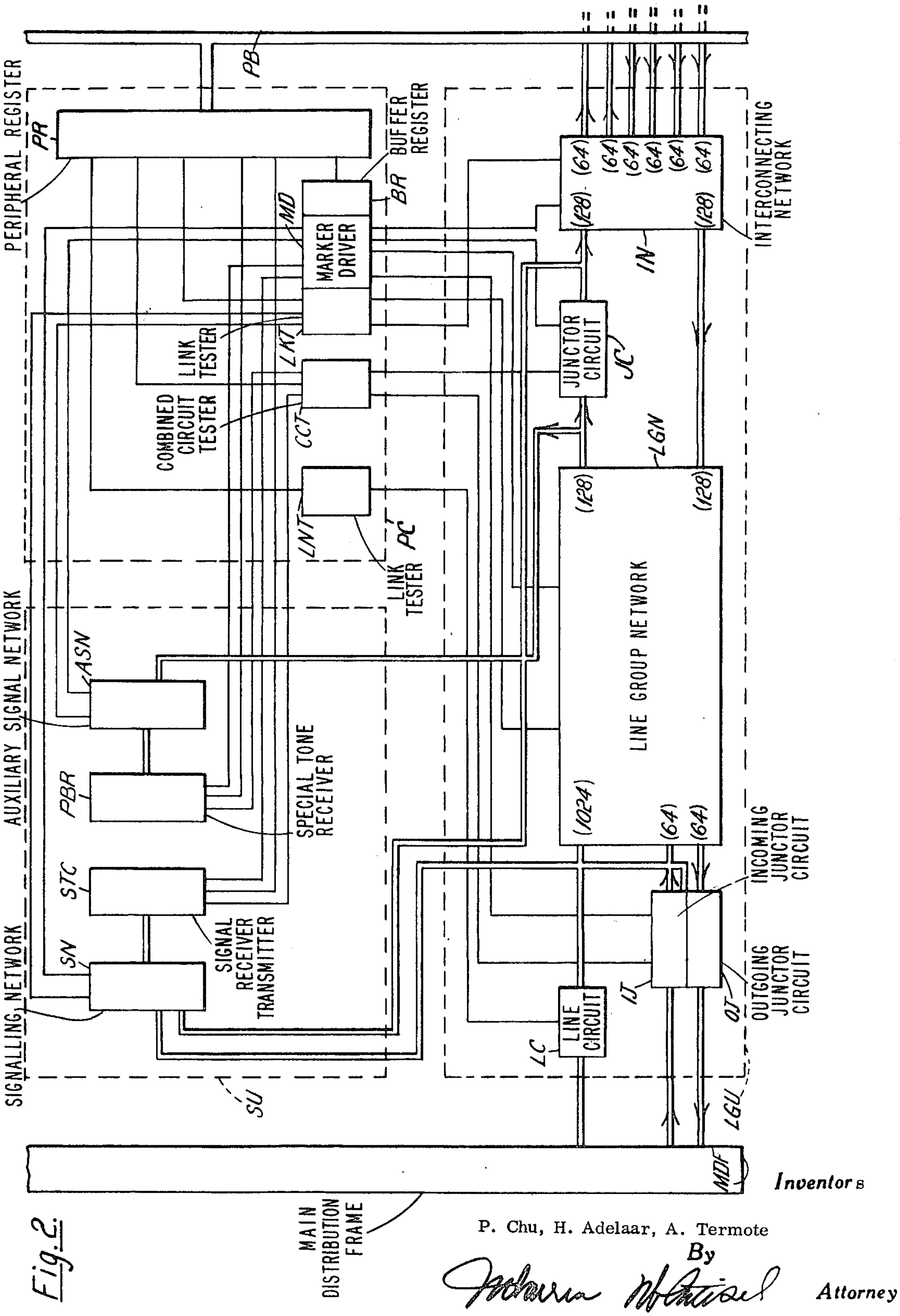
FIG. 2, the block diagram of the line group unit, signalling unit and peripheral circuits appearing in FIG. 1.

FIG. 2 represents the line group unit such as $LGU_0$, the signalling network such as $SU_{01}$ and the peripheral circuits such as $PC_{01}$ in more details.

A line group unit LGU is shown to include the line group switching network proper LGN which is shown connected at its left-hand side to the main distributing frame MDF through line circuits LC and also through incoming junction circuits IJ and through outgoing junction circuits OJ. As indicated by the bracketed FIGS., there are 1,024 bidirectional line terminations and 64 trunk terminations for each way. On the right-hand side, network LGN leads through the 128 junctor circuits JC to an interconnecting network IN which has 128 inlets for connection to the junctor circuit outputs and 128 outlets to return into the main switching network LGN. Additionally, there are two sets of 64 outlets already represented in FIG. 1 and leading respectively to the odd and even numbered line group units so that on the assumption of there being four such modules, four incoming connections toward the interconnecting network IN have been represented.

To complete the description of the transmission connections shown in FIG. 2 by way of thick lines, signalling connections are also provided between the incoming and the outgoing junction circuits IJ/OJ and signal receivers and transmitters STC grouped in a pool, this equipment being part of the signalling unit SU and being reached through a small signalling network SN. As indicated in FIG. 2, the same signal transceivers STC are also connected to the outputs of the junctor circuits JC. These signal receivers and transmitters can be designed in accordance with specifications for interregister signals; the receivers are arranged to accept either tone or pulse signals and to present them to the central processor in coded form, each code representing a numerical digit; the transmitters accept such digits from central control and convert them into the required pulse or tone signals. These units are completely passive, all code checking and timing functions are carried out by common control causing these units to be scanned at regular intervals.

A last transmission path indicated by a thick line is shown to exist between the junctor circuit inputs and a group of special tone receivers PBR which can be reached through an auxiliary signal network ASN. These special tone receivers are provided in order to cope with calls from subscribers equipped with push button dialling sets. Thus, whenever such a call is recognized, the path normally set up towards a free junctor circuit JC is extended through the auxiliary switching network ASN to a free pushbutton tone receiver PBR, and throughout the dialling phase the supervisory functions are taken over by the latter.

The peripheral circuits PC control both the line group unit LGU and the signalling unit SU is able to communicate with a central processor through a peripheral register PR coupled to the peripheral bus PB. In addition to the peripheral register which is used for both way communications with the central processor, PC contains the line tester LNT, the link tester LKT and the combined circuit tester CCT for extraction of information from the switching network and associated circuits. Finally, the peripheral circuits PC also include the marker driver MD which is provided with a buffer register BR for communication with the peripheral register PR, this circuit associated with LKT being used for network path and relay setting. These various circuits are all slave devices acting in response to interrogation and switching orders issued by the central processor.

As shown, the line tester is coupled to the line circuit LC since its function is to interrogate the lines for the purpose of detecting service requests and/or for checking.

The combined circuit tester CCT is shown to be coupled to the trunk and to the junctor circuits as well as to the signalling units STC and PBR. It is used for interrogation of the scan points associated with such circuits.

The third tester is used to ascertain the conditions of the various links needed for the selection of a free path between two given network terminals. Thus, the link tester LKT will be selectively addressed by the processor when the latter has received all relevant information relating to a given call. Accordingly, as shown in FIG. 2, the link tester LKT is connected to the main switching network LGN, to the interconnecting network IN as well as to the signalling network SN and the auxiliary signalling network ASN in the signalling unit SU.

Whereas the testers provide information about the state of the network and its associated relay sets, the marker-driver MD produces changes of state in the switching networks in accordance with orders formulated by the central processor. Each switching order received through the peripheral bus PB contains all information required for the operation to be carried out completely and this is kept in a separate buffer register BR throughout the duration of the operation, while the peripheral register PR remains normally available for interrogation of circuits or links not affected by the switching operation under completion. Preferred circuits for this marker-driver are to be found in the copending U.S. Pat. application Ser. No. 698,463 entitled Automatic Switching System, Selecting System and Check Circuits filed on Jan. 17, 1968, and assigned to the present assignee. In view of its function, as shown in FIG. 2, the marker-driver MD is associated with the main switching network LGN and the interconnecting network IN as well as with the trunk circuits IJ/OJ and the junctor circuits JC all in the line group unit LGU, and moreover with the two signalling networks and with the two sets of transmitters and receivers included in the signalling unit SU.

Figure 3:
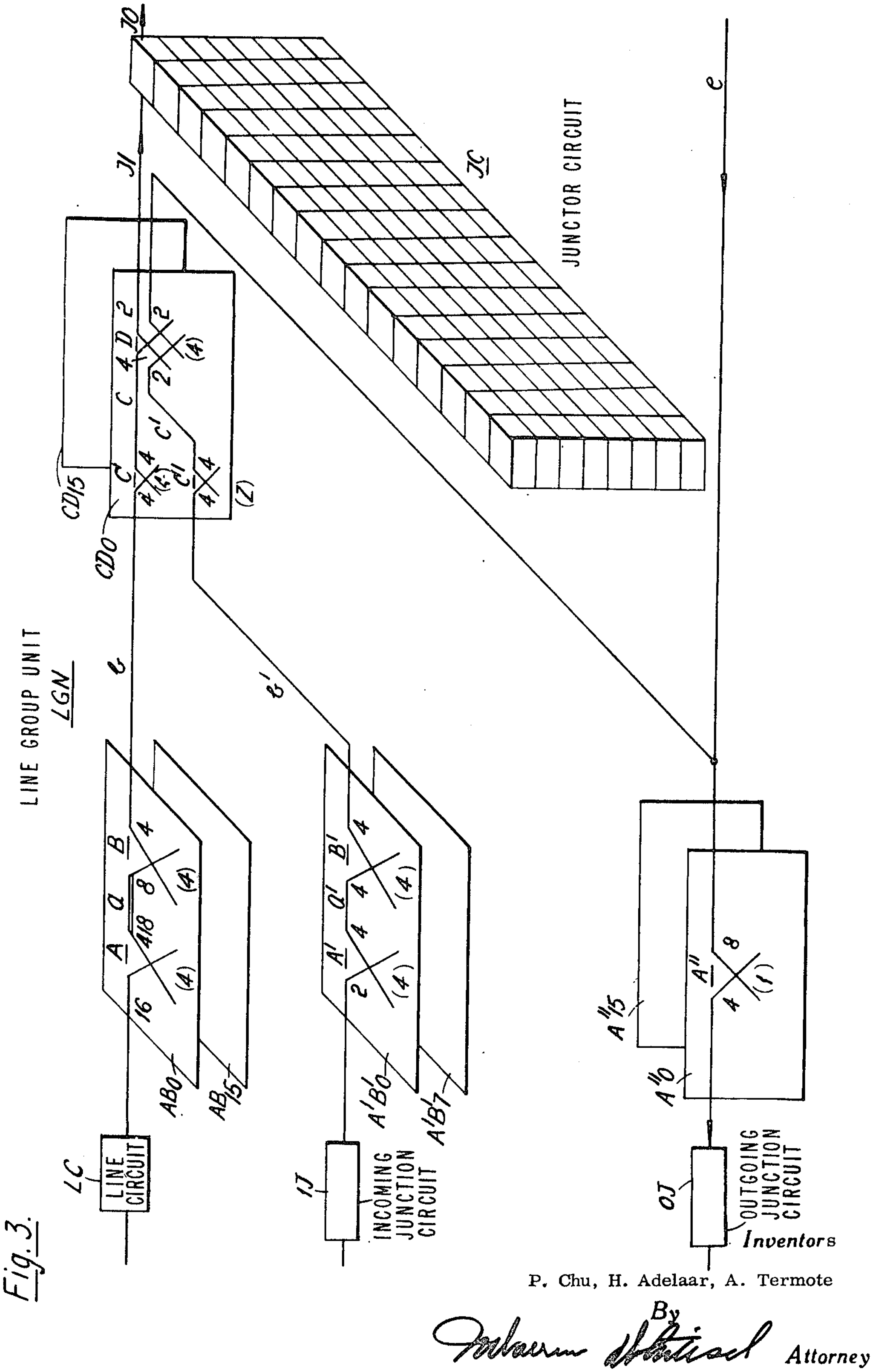
FIG. 3, the trunking scheme of the line group network part of the line group unit of FIG. 2.

The detailed trunking scheme for the switching networks part of a line group unit of 1,024 subscribers lines will now be described with the help of FIGS. 3 and 4. Such a switching network has been calculated for an average both-way traffic of about 0.1 Erlang per subscriber. It is naturally susceptible of ready modifications in its size for higher or lower traffic capacities. FIG. 3 particularly represents the line group network LGN together with the junctor circuits JC while FIG. 4 shows the interconnecting network IN cooperating with LGN to return into this network part of the same module or to gain access to this same network LGN in a different unit of 1,024 subscribers lines associated with a set of outgoing and incoming junctions.

FIG. 3 shows that the line group network LGN essentially comprises four partial networks in addition to the junctor circuits JC. At the left-hand side of the drawing, the line circuits LC are coupled to line concentrators which can be visualized as a stack of 16 concentrators planes $AB_{0/15}$. On the other hand, the incoming junction circuits IJ are connected to junction expanders which can be visualized as a stack of eight expander planes $A'\ B'_{0/7}$. Thus, the line concentrators will enable a reduction in the number of outlets on their right-hand side, i.e. the *b*-links as compared to the number of subscribers lines, while the junction expanders will produce the opposite effect, i.e. an increased number of *b'*-links on the right-hand side as compared to the number of incoming junctions. This has the advantage of equalizing the traffic on the right-hand side of these two networks in view of the higher traffic on the junctions than on the subscribers lines. The third network serves for the connection of the outgoing junction circuits OJ and can be visualized as a stack of junction concentrator planes $A''_{0/15}$ giving access on the right-hand side to so called $e$-links Here the concentration is effected in the other direction as considered for the subscribers lines, i.e. this time concentration occurs from the $e$-links towards the high traffic capacity outgoing junction circuits OJ. The fourth network represented in FIG. 3 is made out of a series of mixing grids to which the first three networks have access, and which can be visualized as a stack of 16 mixing planes $CD_{0/15}$. At their left-hand side, the mixing grids $CD_{0/15}$ are coupled to the line concentrators and to the junction expanders through the $b$ - and the $b'$-links -links respectively. At its right-hand side, the mixing planes $CD_{0/15}$ are coupled to the input terminals JI of the junctor circuits JC and also to the $e$-links.

FIG. 3 represents the AB and A'B' planes horizontally whereas the CD together with the A'' planes, are arranged vertically. This is to indicate that the outlets on the right-hand side of any of the AB or A'B' planes such as $AB_0$ for instance are always distributed among the 16 CD mixing planes and reciprocally. This means that any inlet of the switching network LGN has full accessibility to the junctor circuits JC whether this inlet be a subscribers line or incoming junction circuit.

The switching planes in each stack shown in FIG. 3, and this is also true for FIG. 4, are all identical, so that only the composition of one switching plane out of each stack has been indicated in the FIGS.

As shown, a line concentrator such as plane $AB_0$ is a two stage switching network including four (as indicated by the bracketed number) A switches and four B switches. All the switches involved in the networks of FIGS. 3 and 4 and in fact in such auxiliary signalling networks as SN and ASN in the signalling unit SU of FIG. 2 are coordinate switching arrangements of cross-points which may preferably be of the generally well-known type such as reed relays or rectifiers. As indicated in FIG. 3, there are 16 terminals on the line circuit side (LC) for the A switches which have on the other hand eight terminals connected to so called $a$-links, every one of the 16 terminals having access to only four out of the eight $a$-links connected to the switch concerned, this being indicated by 4/8. Actually, in all the remaining switches, the connections are more straight forward, every inlet having access to every outlet so that the number of cross-points of a switch such as the B switch is simply equal to the product of its two sets of terminals, i.e. $8 \times 4 = 32$. In FIG. 3 the $16 \times 4 = 64$ lines connected to an AB network can be coupled to any of 16 outlets or $b$-links coming out of this network via a unique path. This is due to there being a pair of $a$-links (indicated by the double line) between every pair of A and B switches, with each of the 64 lines having access to one $a$-link out of the four pairs connected to its A switch.

The arrangement is similar for the A'B', networks serving the incoming junctions IJ. Each set of $2 \times 4 = 8$ incoming junctions coupled to A'B' plane has access to any out of the 16 outlets or $b'$-links going out of that plane via a unique path, there being this time a single $a'$-link between every pair of A'B' switches.

In each case the 16 outlets or $b$- and $b'$-links from an AB or A'B' plane lead to distinct CD mixing planes. This number of 16 mixing networks is suitable for a both-way traffic per line 0.1 Erlang. For a higher or for a lower traffic this number can be increased or decreased and such networks as the line concentrators $AB_{0/15}$ can be modified accordingly to either reduce or increase the concentration ratio which is $64/16 = 4/1$ for the network represented. Thus, the number of mixing networks and accordingly the number of $b$ or $b'$-links going out of every AB or A'B' plane can be as high as 24 or as low as 12 in exceptional cases of high or low average line traffic density. The number of both the incoming and the outgoing junctions may go as high as 96 per line module. In each case, the networks AB and A'B' will serve to approximately equalize the traffic densities as the bidirectional subscribers line and unidirectional incoming trunk traffic merge into the CD mixing network.

Each mixing grid such as $CD_0$ must in turn have access to each of the line concentrators $AB_{0/15}$ and to each of the trunk expanders $A'B'_{0/7}$. For the former, this is achieved by the $b$-links from the 16 AB planes being coupled in each mixing grid such as $CD_0$ to the four inlets of four C switches which have each four outlets or so-called $c$-links. The $B'$-links from the eight A'B' planes are connected to similar C' switches but whereas there are four C switches per CD grid since there is a total of 16 line concentrators, there are only two C' switches as there are only eight trunk expanders ($A'B'_{0/7}$). The CD grids which are also two-stage networks have the $c$-links and $c'$-links connected to the inlets of D switches which as indicated have a total of $4 + 2$ inlets and a total of $2 + 2 = 4$ outlets. In this manner, each D switch can be coupled to each of the four C switches through four of its inlets and also to each of the two C' switches through the remaining two inlets. A total of four D switches is provided per grid so that with the four outlets on each of the C and C' switches, again each of the latter can be coupled via a $c$- or a $c'$-link to every one of the four D switches.

Since two of the outlets of each D switch are connected to the input JI of the junctor circuit JC, each CD plane has thus access to a column of eight junctor circuits. The number of columns will accordingly vary in accordance with the number of mixing grids and for the stack of 16 represented there are thus 16 columns of eight junctor circuits making up a total of 128.

The outputs JO of the junctor circuits are connected to the interconnecting network IN and the corresponding trunking scheme is detailed in FIG. 4. The latter shows that this network is essentially composed of three switching parts. All are designed to establish connections between the junctor circuits outputs JO and the $e$-links returning to the line group network of FIG. 3 either in the originating line module or in the some other line unit. The first partial network comprises the eight mixing grids which can be visualized as indicated as a stack of eight mixing planes $EF_{0/7}$ and it couples the junctor circuit outputs JO with the $e$-links in the same module. The second partial network is an outgoing switching stage which couples the junctor circuit outputs JO to two sets of conductors leading respectively in multiple fashion to the odd and even numbered modules. This outgoing partial network can be visualized as a double stack of concentrating planes $G_{00/07}$ and $G_{10/17}$ giving access to so-called $g$-links leading to the even numbered modules ($G_{00/07}$) and to the odd numbered modules ($G_{10/17}$). Finally, the third partial network represented in FIG. 4 is constituted by the incoming networks or expanders coming from the various modules including the one shown. For the exchange considered, i.e. 4,096 subscribers lines, each interconnecting network IN will thus include four stacks of expanding incoming networks, only the first and the last of which, are represented in FIG. 4 by corresponding stacks of planes, i.e. $H_{00/07}$ as the eight planes coming from the shown module and $H_{30/37}$ as the eight planes coming from the fourth line group unit $LGU_3$ (FIG. 1). Homologous outlets from the four stacks of incoming planes $H_{00/07}$, ..., $H_{30/37}$ are multiplied towards the $e$-links which reenter the main switching network LGN using the second pair of outlets in each of the $4 \times 16 = 64$ D switches.

The way in which each of the planes shown in FIG. 4 is constituted is represented schematically in FIG. 4. In the same way as in FIG. 3 so that it is clear for instance that the $EF_{0/7}$ junctor mixing planes each include two switching stages the first comprising two F switches and the second four E switches each of the switches in one stage having access to each in the other stage and the F switches having eight inlets while the E switches have four outlets. In this way, a set of 16 junctor circuit outputs JO coming from different CD planes is connected to the $2 \times 8 = 16$ inlets of an EF plane such as $EF_0$ and each of these 16 junctor circuit outputs can have access to any out of a set of 16 $e$-links which will be provided with connections to D switches in distinct CD planes.

Likewise, the 16 e-links associated with a particular EF plane are connected to distinct A'' planes (FIG. 3) leading to the outing junction circuits OJ.

Although the network is of the type providing a single path between such circuits as a line circuit LC and a junctor circuit JC for instance, it will be appreciated that once a particular junctor circuit JC has been chosen for interconnection to a calling line circuit LC or a calling incoming junction circuit IJ, due to the junctor mixing grids, this particular junctor now has access to a desired called line or to a desired outgoing junction circuit OJ through as many as 16 distinct possible paths. In this way, a junctor seized during the preselection phase of the establishment of a call can be used again for call termination in roughly 75 percent of the cases. Thus, it is only for one-fourth of the cases that additional central processor time will be needed to select a new route via another free junctor circuit which will eventually give access to the desired called circuit.

The rows of 16 junctor circuit outputs JO are also connected to particular planes out of the $G_{00/07}$ and $G_{10/17}$ series which as indicated have only one switch with eight inlets and four outlets towards the g-links. Thus, out of every module there are two sets of multiplied g-link outlets, each set including $4 \times 2 \times 8 = 64$ outlets leading to the odd and even numbered modules respectively. The four outlets of every G switch are coupled to distinct H switches in the corresponding H plane and this full accessibility between the G and H switches is also true in the opposite direction so that each H switch has two g-link inlets and four outlets towards the e-links in order to have a set of 16 e-links out of each H plane.

Thus, the F and G switches constitute the outgoing section of the second switching part formed by the interconnecting network IN while the E and H switches constitute the incoming section.

This particular way to interconnect the various modules is not the only one, but it has found advantageous when considering that in a large range of exchanges, the number of modules of about 1,000 lines may vary between 1 and 20.

For the same quality of service in an exchange where the average traffic in the two directions per subscriber's line is 0.1 Erlang, instead of having two sets of 64 g-links outlets from every module irrespective of the total number thereof, one could arrange the G and H switches so that the former would give a total of 64(N-1) g-links outlets whereas the H switches would provide for connections to a like number of g-link inlets, N representing the number of modules. In such a case, in each G plane there would be four G switches each with four inlets on the junctor side and with 2(N-1) g-links towards the module interconnecting frame MIF. The H switches would be identical and there would also be four per H plane such as $H_{00}$. With this arrangement, to afford the same grade of service the EF mixing planes would have to be modified and in particular, the number of f-links would be doubled, reaching a total of 128 per module by using four F and four E switches each with four inlets and four outlets and again on a full accessibility principle with every switch of one stage having access to every switch of the other stage. With such a modified arrangement, it can be reckoned that the cross-point expenditure of the network of FIG. 4 would reach N+1/2 per subscriber's line. On the other hand, for the scheme represented in FIG. 4 one finds that the total number of cross-points shown therein corresponds to N+7/4 crosspoints per subscriber's line when N is at least equal to 2, the interconnecting network IN necessitating 1.5 cross-points per subscriber's line in addition to those of FIG. 3 when there is only one module, i.e. N = 1.

From the above formulae, it is clear that both schemes give the same result of three additional cross-points per subscriber's line for the interconnecting network IN when N is equal to 5 and while the scheme obeying the formula N+1/2 gives a lesser number of additional cross-points for a number of modules smaller than 5, the difference does not exceed three-fourths of a crosspoint per subscriber's line whereas more substantial differences, this time in favour of the scheme represented in FIG. 4, are secured when the number of modules exceeds 5. This is due to the fact that the scheme with even and odd module multiples halves the slope of increase in function of N and for the large exchanges the advantage can be very noticeable especially since the crosspoint saving is multiplied by a large number of lines. For instance, for an exchange of 17,000 lines there is a difference of three cross-points per line in favor of the scheme of FIG. 4.

It will be observed that the design of an EF plane is identical to that of a G plane together with its associated H plane, e.g. there are eight f-links or eight g-links per plane. The additional intramodule connection possibilities afforded by the $EF_{0/7}$ planes lead however to several advantages. First, additional intramodule interconnecting possibilities are afforded through the network IN without the necessity to use corresponding terminals in the module interconnecting frame MIF. Secondly, it is possible to use the $EF_{0/7}$ mixing grids for an outgoing connection, i.e. from the junctor circuits JC to an outgoing trunk circuit OJ in the desired direction whereas on the other hand if a local call is involved, one may test for a free path from the junctor circuits JC to the desired called line either in the module of the called line or in another module by going through the g-links provided by the module interconnecting frame MIF. It is only if there is failure to find a free path in both cases that attempts might then be made using the possibilities normally afforded to the other case. In other words, if one fails to find a free path between the junctor circuits JC and a free outgoing junction circuit OJ in the desired direction through the mixing grids $EF_{0/7}$, a path leading to the desired outgoing junction circuits OJ associated to other modules than that of the calling line may be found by using the sets of g-links leading to all the other modules. On the other hand, if the tests for a called line through the g-links are unsuccessful and if the called line is in the same module as the calling line or calling incoming junction circuit IJ, then further attempts may be made using the f-links afforded by the junctor mixing grids $EF_{0/7}$.

Considering FIGS. 3 and 4, it will be realized that a line group is practically independent of the size of the exchange. Only the number of stacks of H planes has to be adapted in accordance with the number of modules. Thus the units are practically self-contained. By way of example, for an exchange of about 2,000 lines maximum capacity and thus using two line group units served by the same signalling unit SU and the same peripheral circuits PC, with a total incoming traffic of about 180 Erlangs, a total of 25,000 cross-points will be necessary for speech connections, corresponding therefore to 12.5 cross-points per subscriber's line. The additional networks SN and ASN (FIG. 2) needed to gain access to the common pools (for the two line groups) of signal transmitters and receivers will not add significantly to this number of cross-points. Signalling network SN can be a two-stage network enabling communications between STC and the incoming and outgoing junction circuits IJ/OJ of the two line modules as well as with the junctor circuits JC. A two-stage network will also be satisfactory for providing signalling connections between the pushbutton tone receivers PBR and the junctor circuits JC.

Altogether, these signalling networks would normally add between 1 and 1.5 crosspoint per subscriber's line.

The use of a pool of sender-receivers STC means that no junctor circuit need be selected on behalf of an incoming call until all the digits have been received from the other exchange (calling line). The identity of the desired called subscriber or that of the outgoing trunk will be stored in the buffer register and accordingly there is no necessity for an intervention of the marker-driver circuit MD (FIG. 2) after a free path has been found between the incoming junction circuit IJ and a free junctor circuit JC since a free path may immediately be selected between the latter and the called line or the outgoing junction leading to the desired distinct exchange if a transit call is involved.

Figures 5, 6:
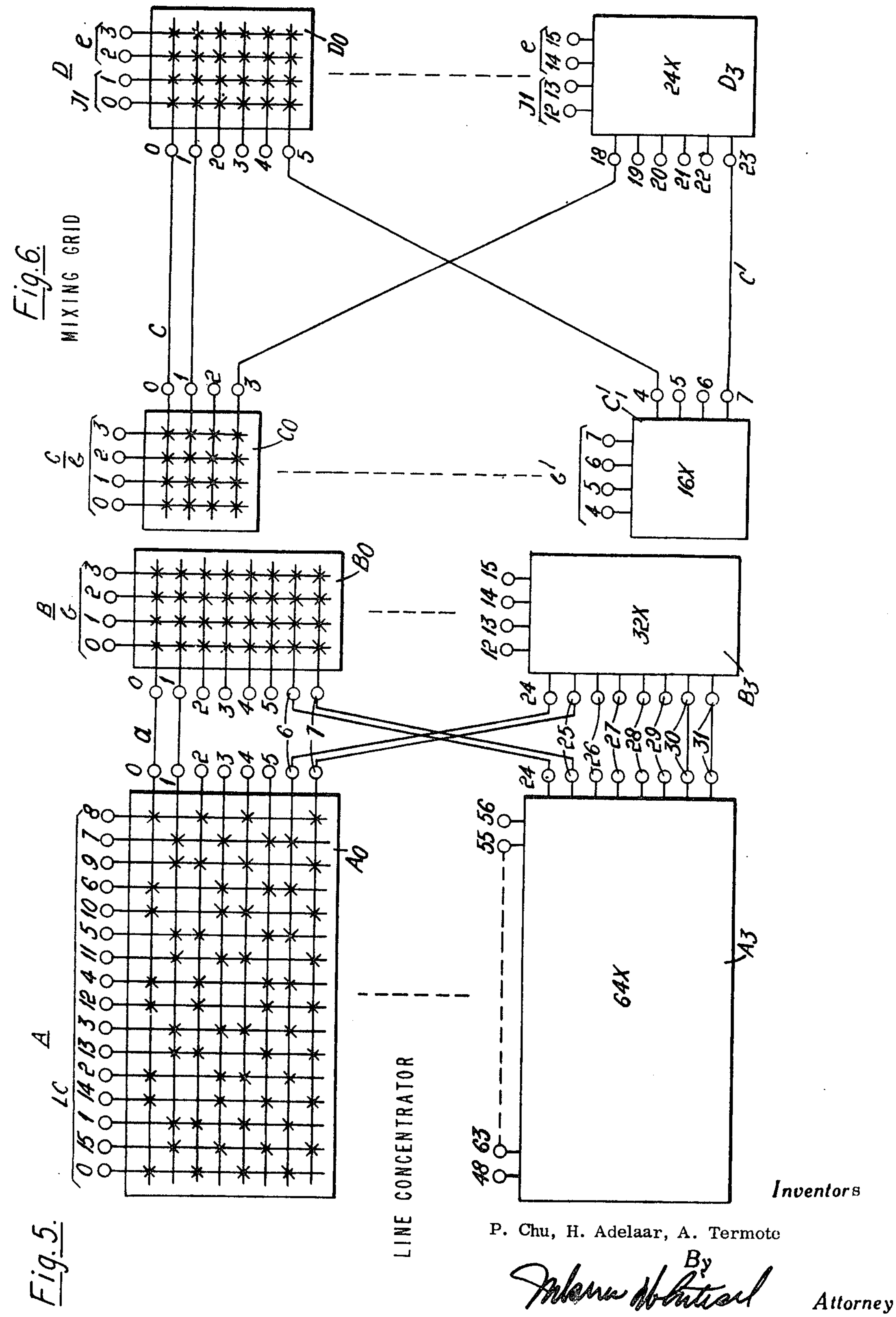
FIG. 5, a line concentrator part of the line group network of FIG. 3.
FIG. 6, a mixing grid part of the line group network of FIG. 3.

FIG. 5 represents the detailed switching arrangement for the line concentrators or AB planes represented in FIG. 3 as coupling the line circuit LC to the *b*-links. The first and the fourth A switches, i.e. $A_0$ and $A_3$ as well as the first and the fourth B switches, i.e. $B_0$ and $B_3$ are represented in FIG. 5 and it is seen therefrom that both the four switches forming the A stage and the set of four constituting the B stage are matrices of cross-points, an A switch having 16 terminals on the side of the line circuits LC and eight terminals on the side of the *a*-links while a B switch has also eight terminals on the side of the *a*-links and four on the side of the *b*-links. As indicated, there is a pair of *a*-links interconnecting every A with every B switch so that there are altogether 16 such pairs. The cross-points are indicated by crosses for $A_0$ and $B_0$. Whereas the latter is seen to be a straight forward rectangular arrangement comprising $32 = 4 \times 8$ cross-points, there are only 64 cross-points in an A switch such as $A_0$ despite the latter constituting at $16 \times 8$ coordinate arrangement. This is because each of the terminals on the side of the line circuits LC is connected to only one A link out of each of the four pairs coupled to the A switch concerned. There are 16 possibilities of connecting these terminals on the line side to combinations of *a*-links out of the four pairs and as represented in FIG. 5, all the 16 inlets are connected to different combinations, pairs of terminals coupled to complementary combinations being pictorially associated i.e. terminal O on the LC side coupled to the even numbered terminals on the *a*-link side, that is to say 0–2–4–6 is immediately followed by terminal 15 which is coupled to the odd numbered terminals 1–3–5–7, and so on.

FIG. 6 represents a mixing grid such as $CD_0$ of FIG. 3 whose first stage includes four C switches and two C' switches with only the first C switch, i.e. $C_0$, and the second C' switch, i.e. $C'_1$, being shown, the second stage comprising four D switches of which only the first i.e. $D_0$, and the last $D_3$ are shown in FIG. 6. Each C or C' switch has four terminals on the side of the *b*-links or *b'*-links respectively and they have each four terminals on the side of the *c*-links or *c'*-links respectively since there are four B switches. On the other hand, the latter, on the side of the *c*- or *c'*-links have six terminals. corresponding to the four C and the two C' switches, while on the other side the D switches have two terminals leading to the inputs JI of the junctor circuits JC and two other terminals connected to the *e*-links. The switches are fully completed rectangular arrangements of cross-points with the C and D switches having 16 and 24 cross-points respectively.

A connection through the networks of FIGS. 5 and 6 may for instance be established in cascade by first marking a terminal on the JI or *e*-link side in a particular D switch whereafter the marking of one of the six outlets towards the *c*-links will permit to operate a single crosspoint in the D switch. This procedure can now be repeated through the C switch and thereafter through the B switch of FIG. 5 selecting one particular *a*-link outlet and thereafter again repeated for the A switch, selecting either a pair of complementary terminals on the line side or one particular terminal. The crosspoint can be of a reed relay-type already mentioned with the reed relay winding connected towards the junctor and its holding make contact towards the line side. Two or four speech contacts may be provided in addition thereto, depending on the type of connection.

The other switching grids are sufficiently described by FIG. 3 and 4 and are not detailed separately as the coordinate matrices are similar to those appearing in FIG. 6.

Although only one switching stage, i.e. the A'' switches, has been shown in FIG. 3 for getting access to the outgoing junctions, more than one switching stage may be used for that purpose, with the junctions leading to a particular direction distributed over the various modular switching units. Mixing grids to give full accessibility between an *e*-link and at least some of the outgoing junctions can be used. The EF planes (FIG. 4) can however carry the major part of the outgoing traffic, only a fraction thereof having to pass through *g*-links in order to go out from the exchange at another module. The use of such planes is particularly advantageous for the initial installations not exceeding the capacity of one module since the G and H planes can then be omitted as well as the module interconnecting frame MIF.

Since service and supervisory functions can be performed by a single full-availability block of general purpose junctor circuits JC, this permits high junctor efficiency to be achieved.

While the principles of the invention have been described above in connection with specific apparatus, it is to be clearly understood that this description is made only by way of example and not as a limitation on the scope of the invention.

We claim:

1. A telecommunication switching system comprising:
a switching network;
a plurality of lines;
common control means for establishing communication paths between selected pairs of lines through said switching network;
wherein said switching network includes a first and a second switching part;
said first switching part including a first and a second group of input terminals connected to said plurality of lines and a first and second group of output terminals; and
said second switching part including a plurality of input terminals being connected to said first group of output terminals of said first switching part, and said second switching part also including a first and a second group of output terminals, the first group thereof being connected to said second group of input terminals of said first switching part.

2. The system in accordance with claim 1, wherein said first switching part includes a plurality of line concentrators and trunk expanders interposed between said first group of input and output terminals thereof, and a plurality of trunk concentrators interposed between said second group of input and output terminals thereof.

3. The system in accordance with claim 2, wherein said second switching part includes a plurality of mixing grids. a first 4. The system in accordance with claim 3, wherein each one of said first group of output terminals of said first switching part is connectable to said second group of input terminals of said first switching part through the plurality of mixing grids of said second switching part.

5. The system in accordance with claim 3, said switching network further including a junctor circuit connected to said second group of input terminals of said second switching part, and an interconnecting network having a plurality of switching units, said interconnecting network being interposed between said junctor circuit and said second group of input terminals of said first switching part.

6. The system in accordance with claim 1, including a plurality of said switching networks and a plurality of said common control means, wherein respective ones of said plurality of common control means are connected to a different pair of said plurality of switching networks.

7. The system in accordance with claim 6, further including a plurality of signalling means, each of said signalling means being connected to a different pair of said switching networks.

8. The system in accordance with claim 6, further including an intermediate distributing frame for interconnecting said plurality of switching networks.

9. The system in accordance with claim 6, said common control means including peripheral circuits and common program-controlled data-processors.

10. The system in accordance with claim 3, wherein said mixing grids include two-stage switches with a connection between each switch of the first stage and each switch of the second stage.

11. The system in accordance with claim 10, wherein the switches of said second stage have at least two output terminals included in said first group of output terminals of said second switching part and at least two output terminals included in said second group of output terminals of said second switching part.

12. The system in accordance with claim 1, wherein said second switching part includes a plurality of switches, at least two of said switches forming an incoming section and at least two of said switches forming an outgoing section respectively, said incoming and outgoing sections forming mixing grids and a link connecting every switch of the incoming section and every switch of the outgoing section.

13. The system in accordance with claim 12, wherein the number of links in said mixing grids is smaller than the number of outside terminals on the input side of said mixing grids.

14. The system in accordance with claim 2, further including a junctor circuit coupled between said second group of input terminals of said first switching part and said second group of output terminals of said second switching part.

15. The system in accordance with claim 14, wherein a signalling means is coupled to said junctor circuit.

16. The system in accordance with claim 15, further including a plurality of incoming trunk circuits connected to said trunk expanders and a plurality of outgoing trunk circuits connected to said trunk concentrators, wherein said signalling means is also coupled to said plurality of incoming and outgoing trunk circuits.

17. The system in accordance with claim 1, wherein said switching network includes a plurality of switching stages, each stage having a coordinate array of cross-points.